US011193525B2

(12) United States Patent
Biaggini

(10) Patent No.: US 11,193,525 B2
(45) Date of Patent: Dec. 7, 2021

(54) COUPLING END PIECE FOR A CONTROL CABLE FROM A GEARBOX TO A BALL JOINT

(71) Applicant: DURA AUTOMOTIVE HOLDINGS U.K., LTD, Birmingham (GB)

(72) Inventor: Jean-Marie Biaggini, Neauphle le Chateau (FR)

(73) Assignee: DURA AUTOMOTIVE HOLDINGS U.K., LTD, Birmingham (GB)

( * ) Notice: Subject to any disclaimer, the term of this patent is extended or adjusted under 35 U.S.C. 154(b) by 320 days.

(21) Appl. No.: 16/191,532

(22) Filed: Nov. 15, 2018

(65) Prior Publication Data
US 2019/0154077 A1 May 23, 2019

(30) Foreign Application Priority Data

Nov. 17, 2017 (EP) ..................................... 17202449

(51) Int. Cl.
*F16C 1/22* (2006.01)
*F16C 1/14* (2006.01)
*F16H 61/36* (2006.01)

(52) U.S. Cl.
CPC .............. *F16C 1/223* (2013.01); *F16C 1/145* (2013.01); *F16H 61/36* (2013.01); *F16C 2361/65* (2013.01); *F16H 2704/00* (2013.01)

(58) Field of Classification Search
CPC .. F16C 1/10; F16C 1/101; F16C 1/102; F16C 1/103; F16C 1/105; F16C 1/12;
(Continued)

(56) References Cited

U.S. PATENT DOCUMENTS 5,564,314 A    10/1996 Gabas
5,682,797 A *  11/1997 Kelley .................... F16C 1/226
                                                            403/11
(Continued)

FOREIGN PATENT DOCUMENTS

EP    0899469 A1    3/1999
EP    2495460 A2    9/2012
(Continued)

OTHER PUBLICATIONS

Machine Translation of EP 2,495,460, obtained Jan. 14, 2021.*
EP Extended Search Report for EP Application No. 17202449.9 dated Apr. 5, 2018, (9 pages).

*Primary Examiner* — Richard W Ridley
*Assistant Examiner* — Brian J McGovern
(74) *Attorney, Agent, or Firm* — Vivacqua Crane, PLLC

(57) ABSTRACT

A connector end piece of a control cable from a vehicle transmission to a ball joint of a part of a gearshift or of a part of the transmission, where the end piece is intended to go over the cable and includes a radial window able to receive, by engagement, a cover having an inner threaded portion, where the cover is movable from a disengaged position to an engaged position in which it engages with a threaded end portion of the cable and locks said cable in position. The end piece comprises an end annular portion, coaxial with the cable, and receiving a security ring, said security ring being movable from an unlocked position to a locked position in which the cover is in disengaged position, the ring holds the cover in the disengaged position and prevents the cover from moving into the engaged position; and when the cover is in engaged position, the ring holds the cover in the engaged position and prevents the cover from moving into the disengaged position.

6 Claims, 3 Drawing Sheets

(58) Field of Classification Search
CPC .... F16C 1/14; F16C 1/145; F16C 1/16; F16C 1/18; F16C 1/22; F16C 1/223; F16C 1/226; F16C 1/26; F16C 1/262; F16C 1/265; F16H 61/36; F16H 2704/00
See application file for complete search history.

(56) References Cited

U.S. PATENT DOCUMENTS

| | | |
|---|---|---|
| 7,779,720 B2 | 8/2010 | Ruhlander et al. |
| 8,850,920 B2 * | 10/2014 | Koontz .................. F16C 1/223 74/502.4 |
| 2006/0230868 A1 | 10/2006 | Ruhlander et al. |
| 2016/0258474 A1 | 9/2016 | Jeong |

FOREIGN PATENT DOCUMENTS

| | | |
|---|---|---|
| ES | 2264606 A1 | 1/2007 |
| WO | WO9410467 A1 | 5/1994 |

* cited by examiner

COUPLING END PIECE FOR A CONTROL CABLE FROM A GEARBOX TO A BALL JOINT

CROSS REFERENCE TO RELATED APPLICATIONS

This application claims priority to European Patent Application No.: EP17202449.9 filed Nov. 17, 2017.

TECHNICAL FIELD

The disclosure relates to the technical sector of equipment for automotive vehicles.

More specifically, the disclosure relates to the connector for control cables from a transmission to a ball joint that a part of a gearshift has or else that a part of the transmission has. In particular, the control cables are used for selecting and/or shifting gears.

BACKGROUND

A connector end piece is known from the state of the art that comprises a housing receiving a connector part intended to cap and connect with said ball joint. The transmission can be a manual or automatic transmission.

Similarly, the connector end piece is intended to cover over the end of the cable. Thus, the cable is inserted into the end piece over some engagement length and is immobilized relative to the end piece during use of the vehicle. In practice, a prior adjustment of the engagement length is necessary for adapting to various vehicle configurations. Then, during the life of the connector end piece, and because of the wear and increase of play between the components thereof, adjustment of the engagement length of the cable can be repeated to provide precise control for the selection and/or shifting of gears.

For that purpose, a connector end piece is known from the state of the art comprising a cable locking and unlocking device for adjusting the engagement length in the end piece. Such a connector end piece is disclosed for example by document U.S. Pat. No. 7,779,720. The end piece described in this document comprises a radial window able to receive a cover having a threaded inner portion by engaging. The cover is movable from a disengaged position to an engaged position in which it engages with a threaded end portion of the cable and locks said cable in position.

Thus, before installation of the coupler end piece in the vehicle, and for example during delivery or maintenance of said cable equipped with the end piece, the cover is held in disengaged position by a security element in the form of a cursor which can be an axially movable tab for locking the cover in the disengaged position. In this way, an operator in the workshop locks the cable according to the desired engagement length. For its part, the cover comprises elastic splines equipped with tabs engaging with the grooves provided in the end piece for holding the cover in engaged position.

This type of connector end piece generally has the disadvantage that is difficult to handle. In fact, during installation of the end piece, when it is time to adjust the engagement length of the cable relative to the end piece, the limited space around the transmission makes access to and handling of the engagement cover and the security cursor difficult. Even more so than for disengaging the cover, the use of a screwdriver type tool seems necessary for unlocking the tabs from the cursor and the splines.

SUMMARY

One of the goals of the disclosure is therefore to propose a connector end piece of an adjustable transmission control cable that can be locked or unlocked on the cable by pressure from a cover, and with which to provide a function called delivery in which the locking of the cable is prevented, and another function called operational, in which disengagement of the cover is prevented by avoiding loss of the cover.

Another object of the disclosure is also to provide visual information about proper locking of the cable.

Another objective is to provide such a connector end piece whose means for blocking the engagement or disengagement of the cover are easy to handle, especially in spaces that are hard to see or difficult to access.

Another objective of the disclosure is to simply and reliably secure the cover in engaged or disengaged position without needing to use an additional part or tool.

In order to resolve the aforementioned problems, a connector end piece has been developed for connecting a control cable of a vehicle transmission to a ball joint for a part of a gearshift or a part of the transmission. The end piece is intended to go over the cable and includes a radial window able to receive, by engagement, a cover having an inner threaded portion, where the cover is movable from a disengaged position to an engaged position in which it engages with a threaded end portion of the cable and locks said cable in position.

According to the disclosure, the end piece comprises an end annular portion, coaxial with the cable, and receiving a security ring. The security ring is movable from an unlocked position to a locked position in which it prevents either the engagement or disengagement of the cover.

More specifically, the security ring is movable from an unlocked position to a locked position in which:
  when the cover is in disengaged position, the ring holds the cover in the disengaged position and prevents the cover from moving into the engaged position; and
  when the cover is in engaged position, the ring holds the cover in the engaged position and prevents the cover from moving into the disengaged position.

In this way, a function referred to as delivery is done by the ring in which locking of the cable is prevented without risk of losing the cover because it is kept in the disengaged position, as well as a function referred to as operational in which disengagement of the cover is prevented. Manipulation of the ring is easy and possible without visibility and in hard-to-reach spaces. In the workshop it is sufficient to simply adjust the engagement length of the cable in the coupling end piece, shift the ring into the locked position so as to engage the cover and shift the ring into the locked position to prevent the disengagement of the cover.

The annular portion may comprise a locked groove and an unlocked groove, and the ring comprises at least one elastic tab engageable, with sliding movement of the ring, in:
  the locked groove to lock the ring in the locked position; or
  the unlocked groove to lock the ring in the unlocked position.

Operation is thus simple and reliable. The ring can be locked in a position in which it blocks the engagement or disengagement of the cover, or in a neutral position in which it allows the movement of the cover into the engaged or disengaged position.

Advantageously, the disengagement of the elastic tab is done by transverse pressure on the ring.

According to a further embodiment, the ring comprises a pin extending axially and intended, when the ring is in the locked position, to come:
- either to be interposed between the cover and the window for preventing the cover from engaging;
- or to be positioned on the cover for preventing the cover from disengaging.

In this way, the cover can be either free to move between the engaged position and the disengaged position, or else blocked in one of these positions. Thus, the cover can take on the position referred to as delivery (disengaged) or operating (engaged) and be blocked securely and simply therein. Visual information on the proper engagement of the pin is available because in the locked position of the ring, the pin comes to be positioned on the cover. In fact, the ring can move into locked position for blocking the cover in the engaged position only if the cover is correctly engaged.

The ring and the coaxial angular portion may comprise additional retention means, for example in the form of a quarter-turn assembly. In this way, the ring is retained on the end piece and there is no risk of it being lost. Handling of the ring is simple.

DESCRIPTION OF THE DRAWINGS

Further characteristics and advantages of the invention will become apparent from the description provided below, which is for reference only and is in no way restrictive, with reference to the accompanying figures, in which.

DETAILED DESCRIPTION

Figure 1:
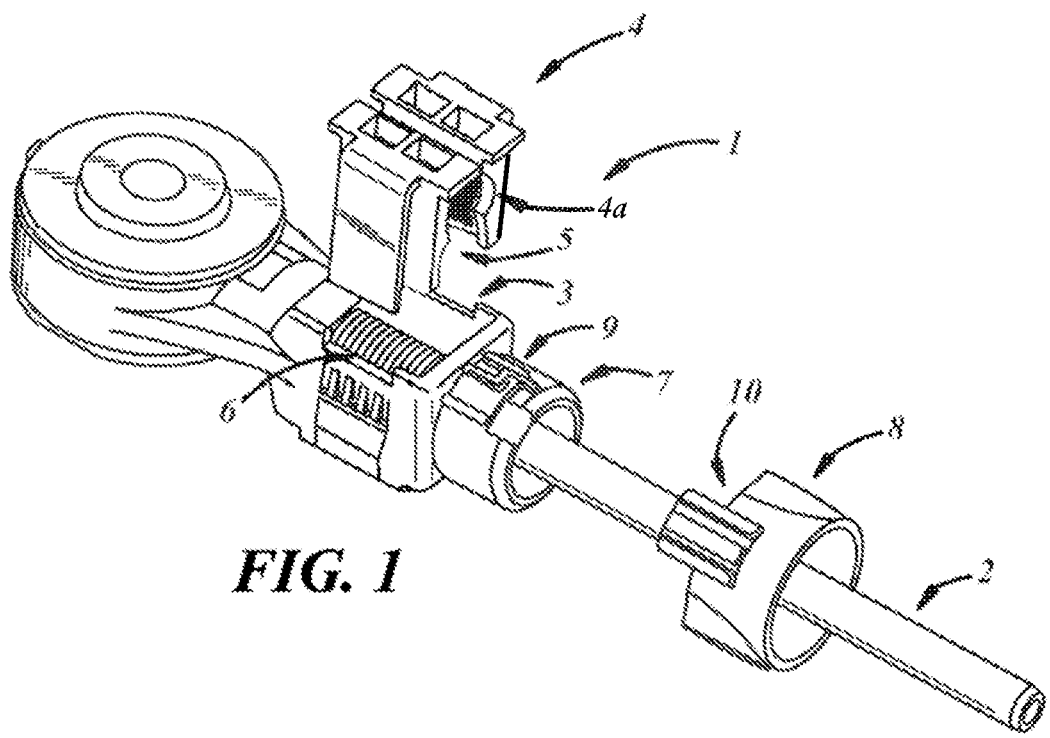
FIG. 1 is an exploded view of the coupling end piece.

The disclosure relates to a connector end piece (1) of a control cable (2) from a vehicle transmission to a ball joint of a part of a gearshift or of a part of the transmission.

The end piece (1) is intended to go on top of the cable (2) and comprises a radial window (3) able to receive a cover (4) having a threaded inner portion (5) by engaging. The cover (4) has a U-shaped profile open towards the cable (2) and is movable from a disengaged position, shown in FIGS. 2, 4 and 5, into an engaged position shown in FIGS. 3 and 6, in which it engages with a portion of threaded end (6) of the cable (2) and locks said cable (2) in position.

Of course, other conformations of the cover (4), such as teeth or other complementary geometric shapes, can be used for locking the cable (2).

According to the disclosure, the end piece (1) comprises an end annular portion (7), coaxial with the cable (2), and receiving a security ring (8).

The security ring (8) is movable from an unlocked position to a locked position in which it prevents either the engagement or disengagement of the cover (4).

More specifically, in the locked position of the security ring (8):
- when the cover (4) is in disengaged position, the ring (8) holds the cover (4) in the disengaged position and prevents the cover (4) from moving into the engaged position; and
- when the cover (4) is in engaged position, the ring (8) holds the cover (4) in the engaged position and prevents the cover (4) from moving into the disengaged position.

The ring (8) is attached to the end piece (1) by a quarter-turn assembly. The end piece (1) also comprises an axial groove (9) engageable with the ring (8). Thus, the ring (8) can move axially between the two positions without risk of accidental detachment. In this way, handling thereof becomes easier.

Figure 2:
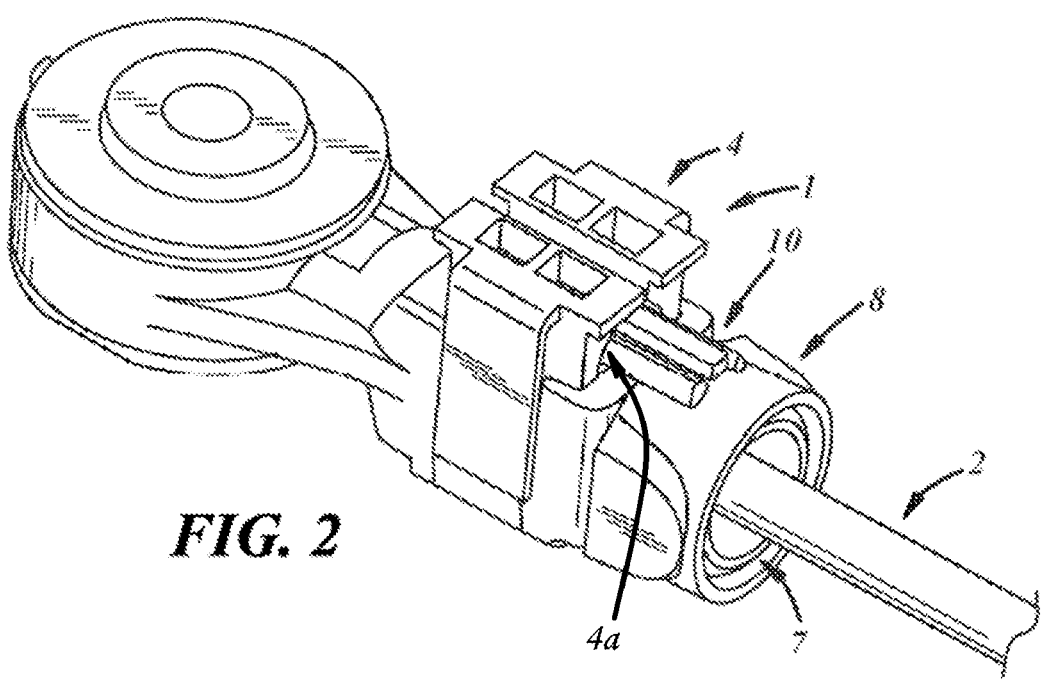
FIG. 2 is a schematic representation in perspective of the end piece with the cover in disengaged position and the ring in locked position.
Figure 4:
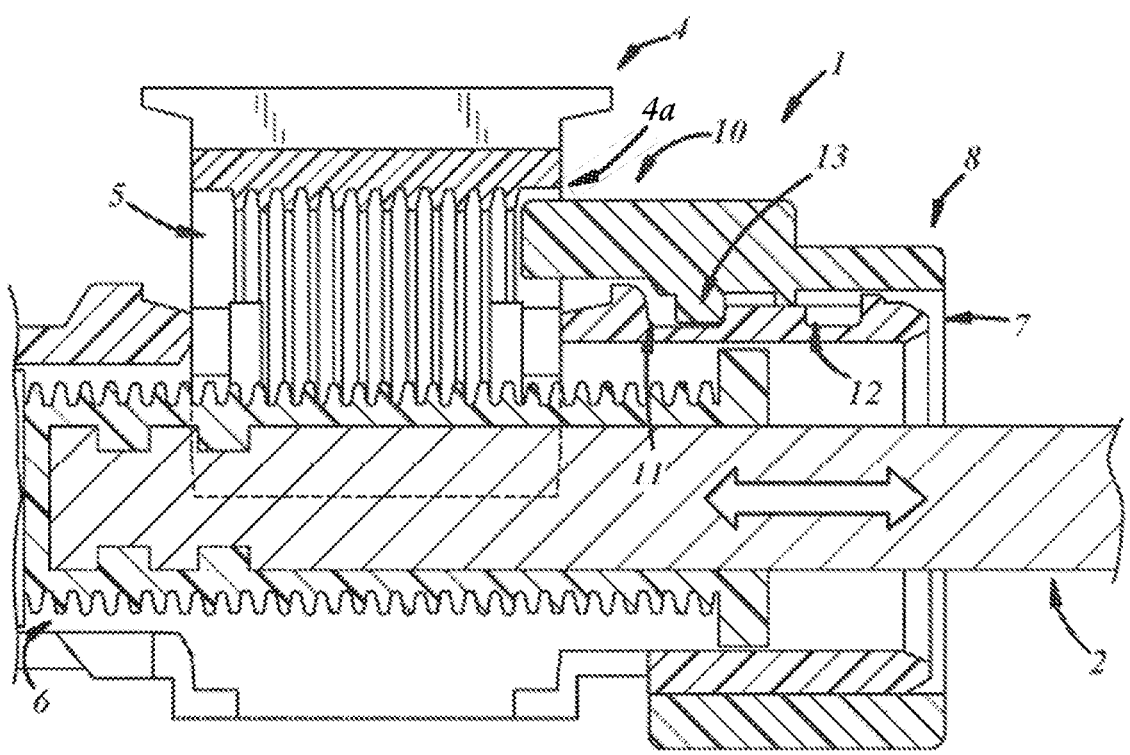
FIG. 4 is a longitudinal section view corresponding to FIG. 2 with the cover in disengaged position and the ring in locked position.
Figure 5:
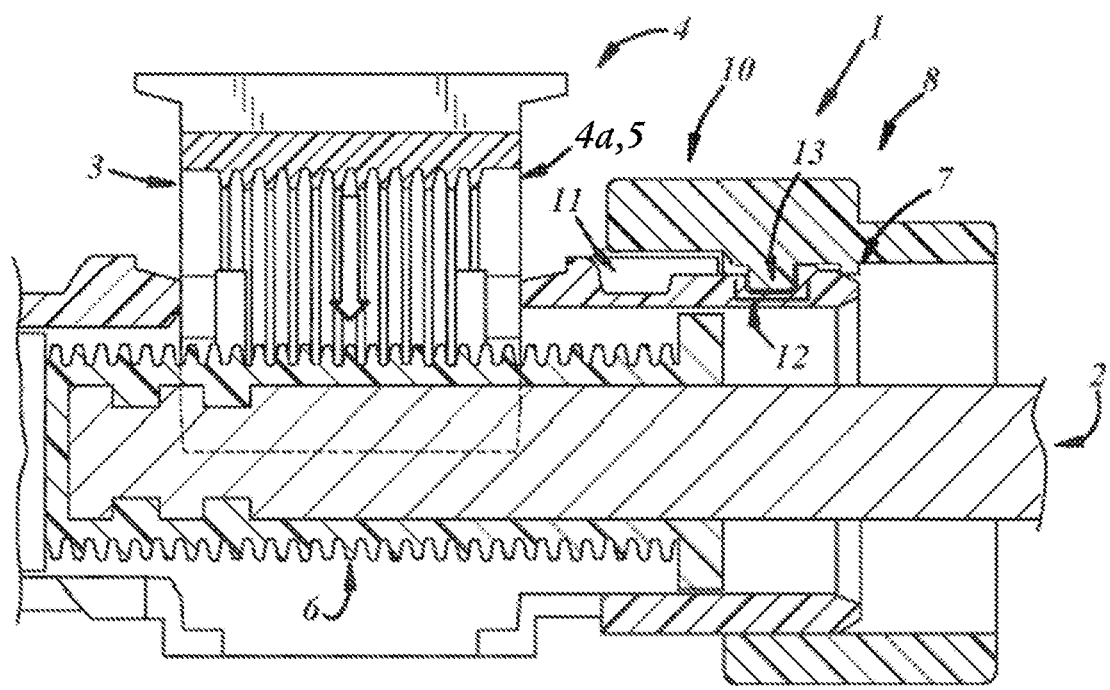
FIG. 5 is a longitudinal section view of the end piece with the cover in disengaged position and the ring in unlocked position.

The ring (8) includes a pin (10) extending axially. When the ring (8) is in the locked position, the pin (10) is insertable between the cover (4) and the window (3) for blocking engagement of the cover (4), as shown in FIGS. 2 and 4. Advantageously, the cover (4) includes a bore (4a) into which the pin (10) penetrates. This position corresponds to the position referred to as delivery in which the cable (2) is free to move, so that locking of the cable can be done intentionally by an operator in the workshop.

Figure 3:
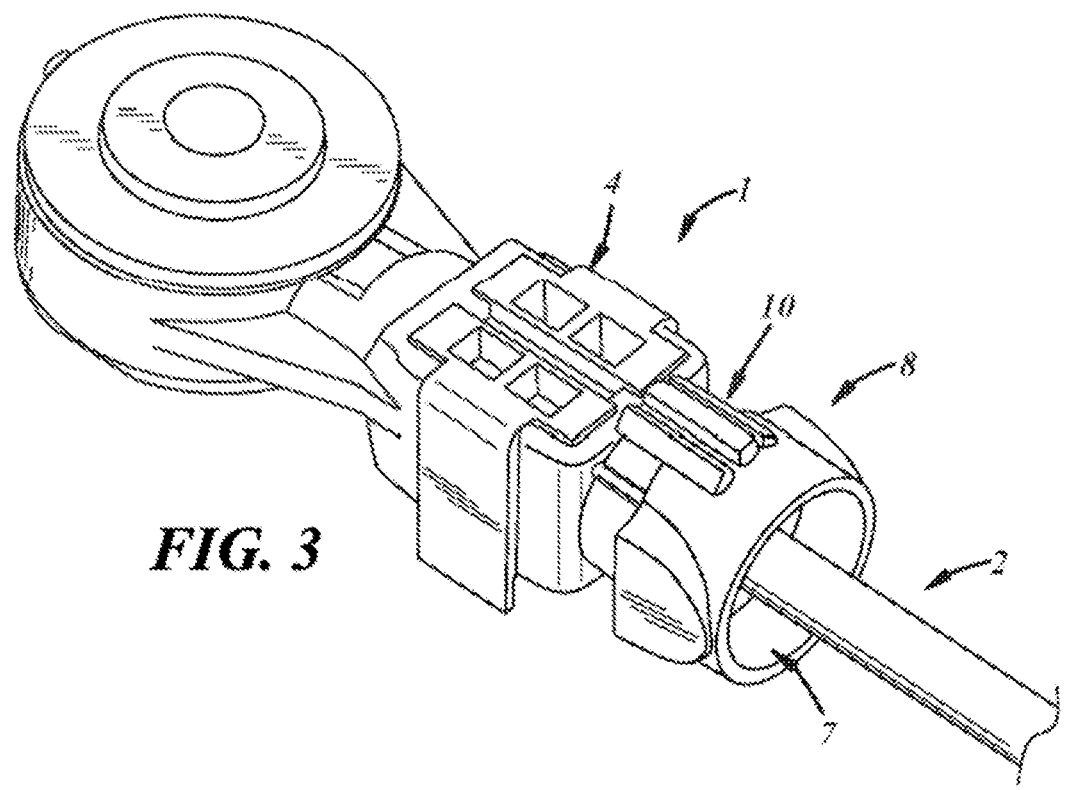
FIG. 3 is a schematic representation in perspective of the end piece with the cover in engaged position and the ring in locked position.
Figure 6:
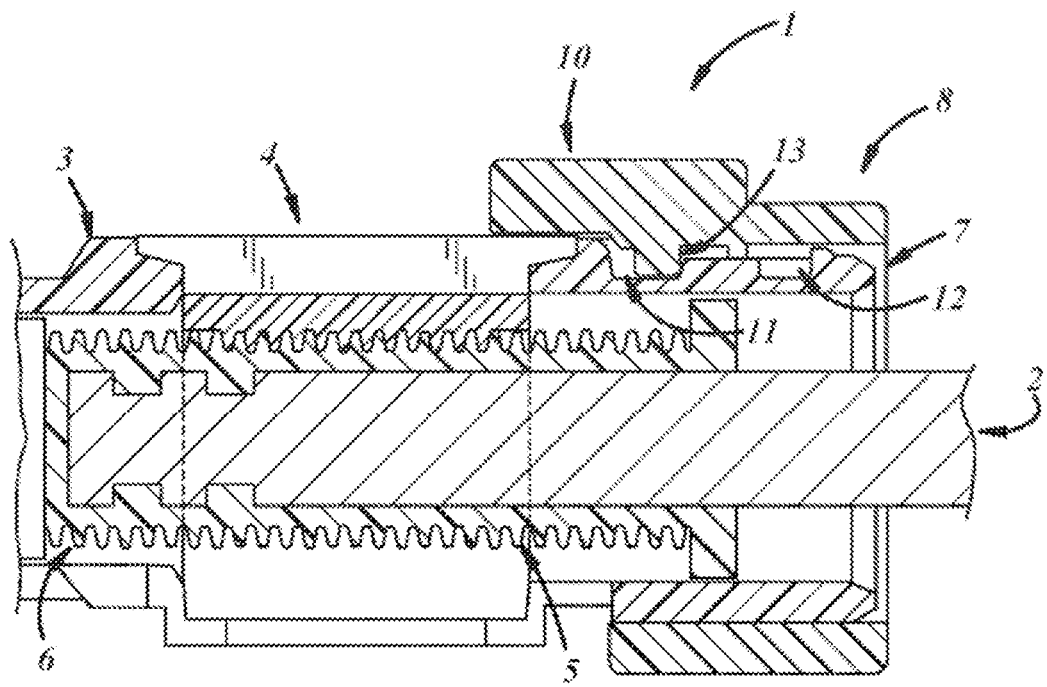
FIG. 6 is a longitudinal section view corresponding to FIG. 3, with the cover in engaged position and the ring in locked position.

The pin (10) is also positionable on the cover (4) for blocking the disengagement of the cover (4) as shown in FIGS. 3 and 6. This position corresponds to the operating position once the cable is installed in the vehicle. Because the pin (10) comes to be positioned on the cover (4) in the locked position of the ring (8), it can provide visual information about the proper engagement of the cover (4), since the ring (8) can move into the locked position for blocking the cover (4) in the locked position only if the cover (4) is correctly engaged.

The annular portion (7) of the end piece (1) includes two transverse grooves, specifically a locked groove (11) and an unlocked groove (12). The grooves (11, 12) can be annular, meaning arranged around the full circumference. They can also be arranged on only one portion of the circumference. Other conformations are possible without leaving the scope of the invention.

The ring (8) comprises at least one elastic tab (13) extending radially towards the cable (2). The ring (8) may comprise two tabs (13), diametrically opposite, in the case where the grooves (11, 12) are annular. The elastic tab (13) is designed to engage at rest in either the unlocked groove (12) or in the locked groove (11). The ring (8) is designed so that the elastic tab (13) disengages from the groove (11, 12) when a radial force is exerted on the circumference of the ring (8). For this purpose, the ring (8) can be elastic and/or have a non-circular transverse section, for example oval. According to another embodiment not shown, the elastic tab (13) can be mounted at the end of a spline mounted pivoting around a hinge, such that the pressure on the opposite end of the spline causes a separation of the tab (13) and its disengagement.

In that way, the elastic tab (13) at rest is brought closer to the axis of the cable (2). When a radial pressure is applied to the ring (8), the lateral parts of the ring (8) come closer to the axis of the cable (2), while the tab (10) separates from the cable (2) and disengages from the groove (11, 12).

As an alternative, the ring (8) can have a conic frustum-shaped longitudinal section. According to this embodiment, not shown, the tab (13) extends from the part having the smallest diameter at rest. When radial pressure is exerted on the part having the largest diameter at rest, the tab (13) separates from the groove (11, 12).

According to the preceding, during operation of the connector end piece (1), the ring (8) is assembled with the annular portion of the end piece (1) by a quarter-turn rotation. The cover (4) is initially in disengaged position, allowing the cable (2) to move freely. To secure the cover (4) in this position, for example during delivery of the cable (2), the ring (8) is moved axially towards the cover (4). A radial force is exerted on the ring (8) to separate the tab (13) from the groove (12), so as to be able to move the ring and come to engage the tab (13) in the locked groove (11). In this position, the pin (10) of the ring (8) is interposed between the cover (4) and the radial window (3). Thus, the cover (4) is blocked in disengaged position by the ring (8) in the locked position.

When the engagement of the cable is adjusted, a radial force is exerted on the ring (8). The elastic tab (13) disengages from the locked groove (11). The ring (8) is moved axially for separating from the cover (4) until the tab comes to engage in the unlocked groove (12) corresponding to the unlocked position of the ring. The cover (4) is no longer blocked and can be engaged in the radial window (3) for engaging with the threaded end portion (6) of the cable (2). The ring (8) can then return into the locked position. The ring (8) can only return to locked position if the cover (4) is correctly engaged; otherwise axial movement of the ring (8) towards the cover (4) is impossible. Thus, it can be easily checked whether the preceding operations have been performed. If the cover (4) was correctly inserted, the pin (10) can slide on the cover (4). The elastic tab (13) engages in the locked groove (11) for locking the ring (8) and preventing the disengagement of the cover (4). The end piece (1) is secured against unintended disengagement and the inspection of the transmission is done with certainty.

Thus, it can be seen from the description that the connecting end piece (1) is easy to handle, particularly in limited spaces and with limited visibility of the end piece (1). The cover (4) can also be secured by the end piece (1) in an engaged and disengaged position, without risk of loss of the cover, simply and securely, and without the need for using additional parts.

The invention claimed is:

1. A connector end piece of a control cable from a vehicle transmission to a ball joint of a part of a gearshift or of a part of the vehicle transmission, where the connector end piece is intended to go over the control cable and includes a radial window able to receive, by engagement, a cover having an inner threaded portion and a bore, where the cover is movable in a radial direction from a disengaged position to an engaged position in which it the cover engages with a threaded end portion of the control cable and locks said control cable in position, wherein the connector end piece comprises an end annular portion, coaxial with the control cable, the end annular portion having a locked groove and an unlocked groove, the end annular portion receiving a security ring, said security ring having a body, a pin, and at least one elastic tab; the at least one elastic tab engageable, with axial sliding movement of the security ring, in at least one of the locked groove and the unlocked groove, the body having an axial end proximate the connector end piece, the pin extending axially towards the connector end piece from the axial end of the security ring, wherein the security ring is movable from an unlocked position to a locked position in which:

when the cover is in the disengaged position, the pin of the security ring extends into the bore of the cover and holds the cover in the disengaged position and prevents the cover from moving into the engaged position; and when the cover is in the engaged position, the pin of the security ring extends over a portion of the cover and holds the cover in the engaged position and prevents the cover from moving into the disengaged position.

2. The coupling end piece according to claim 1 wherein axial sliding movement of the security ring engages the at least one elastic tab in:

the locked groove to lock the security ring in the locked position; or the unlocked groove to lock the security ring in the unlocked position.

3. The coupling end piece according to claim 2, wherein the disengagement of the at least one elastic tab is done by transverse pressure on the security ring.

4. The coupling end piece according to claim 2, wherein, when the security ring is in the locked position, the pin is intended to come either:

to be interposed between the cover and the radial window and within the bore, for preventing the cover from engaging with the threaded end portion of the control cable;

to be positioned overtop the portion of the cover for preventing the cover from disengaging from the threaded end portion of the control cable.

5. The coupling end piece according to claim 1, wherein the at least one elastic tab is formed on a radially inward-facing surface of the pin, and the locked groove and the unlocked groove are formed as radial grooves axially spaced apart from one another on the end annular portion; and wherein the at least one elastic tab is disengageable from the locked groove or the unlocked groove by application of a radial force to a circumference of the security ring.

6. The coupling end piece according to claim 5, wherein in the unlocked position, the security ring is coaxial with the end annular portion and the security ring is retained on the end annular portion by the unlocked groove; and in the locked position, the security ring is coaxial with the end annular portion and the security ring is retained on the end annular portion by the unlocked groove.

* * * * *